United States Patent [19]
Beckman

[11] Patent Number: 5,126,058
[45] Date of Patent: Jun. 30, 1992

[54] SEPARATION OF PHYSICALLY CO-MINGLED PLASTICS USING A SUPERCRITICAL FLUID TO FACILITATE RECYCLING

[75] Inventor: Eric J. Beckman, Pittsburgh, Pa.

[73] Assignee: University of Pittsburgh, Pittsburgh, Pa.

[21] Appl. No.: 647,467

[22] Filed: Jan. 29, 1991

[51] Int. Cl.$^5$ .............................................. B01D 35/18
[52] U.S. Cl. ................................... 210/774; 210/703; 210/771; 210/808; 209/2; 209/11; 209/172
[58] Field of Search ............... 210/800, 808, 703, 706, 210/709, 714, 768, 188, 787, 776, 771, 774; 209/2, 11, 172; 521/40, 40.5

[56] References Cited

U.S. PATENT DOCUMENTS

| | | | |
|---|---|---|---|
| 3,822,015 | 7/1974 | Hsieh et al. | 210/221.2 |
| 4,111,798 | 9/1978 | Peterson et al. | 209/172 |
| 4,379,748 | 4/1983 | Hoogendoorn | 209/11 |
| 4,405,452 | 9/1983 | Wentzell | 209/11 |
| 4,578,184 | 3/1986 | Rasmussen | 209/172 |
| 4,617,111 | 10/1986 | Grimm et al. | 209/2 |
| 4,746,422 | 5/1988 | Grimm | 209/172 |
| 4,844,351 | 4/1989 | Holloway | 209/11 |

*Primary Examiner*—Robert A. Dawson
*Assistant Examiner*—Ana Fortuna
*Attorney, Agent, or Firm*—Reed Smith Shaw & McClay

[57] ABSTRACT

The present invention provides a method for selectively separating co-mingled materials of different densities by selective density flotation of the materials in a fluid in the vicinity of its critical point. The extermely high compressibility of a fluid in the vicinity of its critical point allows continuous variations over the maximum density range to be accomplished using minimal changes in temperature and pressure. Materials exhibiting similar densities can thus be separated by adjusting the fluid density to a point between the two materials.

25 Claims, 3 Drawing Sheets

SEPARATION OF PHYSICALLY CO-MINGLED PLASTICS USING A SUPERCRITICAL FLUID TO FACILITATE RECYCLING

FIELD OF THE INVENTION

The present invention relates to the separation of co-mingled materials of different densities, especially to the use of a supercritical fluid to separate co-mingled plastics.

BACKGROUND OF THE INVENTION

In recent years, public awareness of the need to conserve valuable resources and the lack of acceptable means for disposing of solid waste has led to the adoption of numerous voluntary and mandatory recycling measures.

Polymeric waste materials have received particular attention because of their resistance to biodegradation. Public pressure to reduce the volume of solid waste interred in landfills, coupled with the continuing strong demand by consumers for synthetic polymer products, has thus prompted a rapid expansion in the development of polymer recycling technology.

Strategies for secondary recycling of plastics can be divided into two major areas: (1) those emphasizing material separation and ultimate fabrication of similar end-use products; and (2) those devoted to reprocessing of co-mingled waste to replace concrete and wood in products which do not require the physical properties of the virgin materials. Naturally, co-mingled polymeric waste is often contaminated with other materials, such as wood, paper, metals (both ferrous and nonferrous) and glass. Removal of these non-polymeric components is necessary both to protect equipment from harmful abrasives and to achieve physical properties in the reprocessed material which are reasonably close to those of virgin resin. Furthermore, certain thermoplastic mixtures, such as polyvinylchloride ("PVC") and polyethylene terphthalate ("PET"), can lead to material and equipment degradation when reprocessed together. Finally, experience has shown that physical properties, and thus resale value, of recycled polymeric materials, increases as the purity of the material increases. Consequently, schemes capable of selectively separating each polymeric component from a co-mingled mixture enhance the value of waste thermoplastics.

Synthetic polymer waste streams are generally composed primarily of high and low density polyethylene ("HDPE" and "LDPE"), polypropylene ("PP"), polystyrene ("PS"), both in foamed and bulk form, PET and PVC. The recycling of these thermoplastics has been limited by difficulties in separating the polymers from each other and from non-polymeric contamination. Current schemes to separate thermoplastic waste generally rely on a combination of hand-sorting and either hydrocloning or air classification. A primary drawback in the use of the latter techniques is that several commercially vital separations, such as PVC from PET, or classification of the olefin component of the waste stream, are not feasible using these technologies. Furthermore, component selectivity in both air classifiers and hydroclones is a function of particle size distribution, as well as particle density, which limits overall separation efficiency. The separation efficiencies of these techniques are, therefore, relatively poor, and it is necessary to resort to hand sorting. The disadvantages intrinsic to hand-sorting are obvious.

Although optical-mechanical processes will remove problematic materials such as PVC from the waste stream, such processes may prove suitable only to handling fully-intact thermoplastic bottles. A large portion of the plastic waste stream, however, is likely to arrive at a re-processor in a shredded and bailed form.

Waste paper products have also received particular attention, primarily because of the enormous volume involved. The enormous volume of waste paper interred in landfills has greatly contributed to the current scarcity of available landfill space. The need to recycle paper products is thus of equal if not greater magnitude than the need to recycle plastics.

Current technology allows only for the reprocessing of newsprint for the ultimate fabrication of a similar end-use product. Other grades of paper can be reprocessed for use in a variety of products not requiring the physical properties of the virgin materials. Glossy paper and other paper grades are currently separated by hand prior to de-inking and reuse of the newsprint.

A definite need for an effective method for selectively separating co-mingled materials of different densities therefore exists.

SUMMARY OF THE INVENTION

Generally, the present invention relates to a method for selectively separating co-mingled materials of different densities by selective density flotation.

More specifically the present invention is directed to a method for selectively separating a component material from a mixture of co-mingled materials of different densities by selective density flotation comprising the steps of introducing the mixture of co-mingled materials into a vessel; introducing a fluid into the vessel, the fluid having a range of densities in the vicinity of its critical point such that said fluid's density may be set to be between the density of one component of the co-mingled materials and the densities of the remaining components; adjusting the temperature and pressure of the fluid to set the density of the fluid to a density between the density of one component of the co-mingled materials and the densities of the remaining components to selectively float that portion of the materials having a density less than the set density of said fluid, thereby dividing one component of the materials from the remaining components; and separating the component which has been selectively divided from the remaining components.

The present invention overcomes many of the problems surrounding thermoplastic recycling by providing a method for separating polymers, paper, glass and metals in a density-float process using inert gases in the temperature-pressure region near the critical point. The use of near-supercritical or supercritical fluids offers the following distinct advantages: (1) the extremely high compressibility of a fluid in the vicinity of the critical point allows continuous variations over the maximum density range to be accomplished using minimal changes in temperature and pressure, thereby enabling separation of plastics and other materials exhibiting similar densities by adjusting the fluid density to a point between the two materials; (2) because of the vanishingly small interfacial tension and low viscosity of supercritical fluids, the settling rate of the separated materials is much greater than in a conventional liquid; (3) the use of non-polar supercritical fluids which exhibit poor solvency with respect to high molecular weight materials prevents swelling or deformation of the waste thermoplastics; (4) the use of supercritical fluids with a sufficiently high vapor pressure under ambient temperatures ensures that essentially no fluid residue remains in the separated materials following recovery; (5) the use of non-toxic, environmentally safe, nonflammable supercritical fluids in the recycling process minimizes the environmental impact; and (6) the supercritical fluid can be recycled through the process indefinitely, minimizing raw material costs.

Although the present method is particularly suitable for the selective separation of polymeric materials, the advantages outlined above apply equally to the separation of mixtures of other types of materials. In particular, the present method can be used to separate newsprint from other grades of paper, thereby streamlining the current procedure significantly.

Other details, objects and advantages of the invention will become apparent as the following description of the presently preferred embodiments and presently preferred methods of practicing the invention proceed.

DETAILED DESCRIPTION OF THE INVENTION

A preferred embodiment of the present invention is directed to a method for selectively separating a component material from a mixture of co-mingled materials of different densities by selective density flotation comprising the steps of introducing the mixture of co-mingled materials into a vessel; introducing a fluid into the vessel, the fluid having a range of densities in the vicinity of its critical point such that said fluid's density may be set to a density between the density of one component of the co-mingled materials and the densities of the remaining components; adjusting the temperature and pressure of the fluid to set the density of the fluid to be between the density of one component of the co-mingled materials and the densities of the remaining components to selectively float that portion of the materials having a density less than the set density of said fluid, thereby dividing one component of the materials from the remaining components; and separating the component which has been selectively divided from the remaining components.

Figure 1:
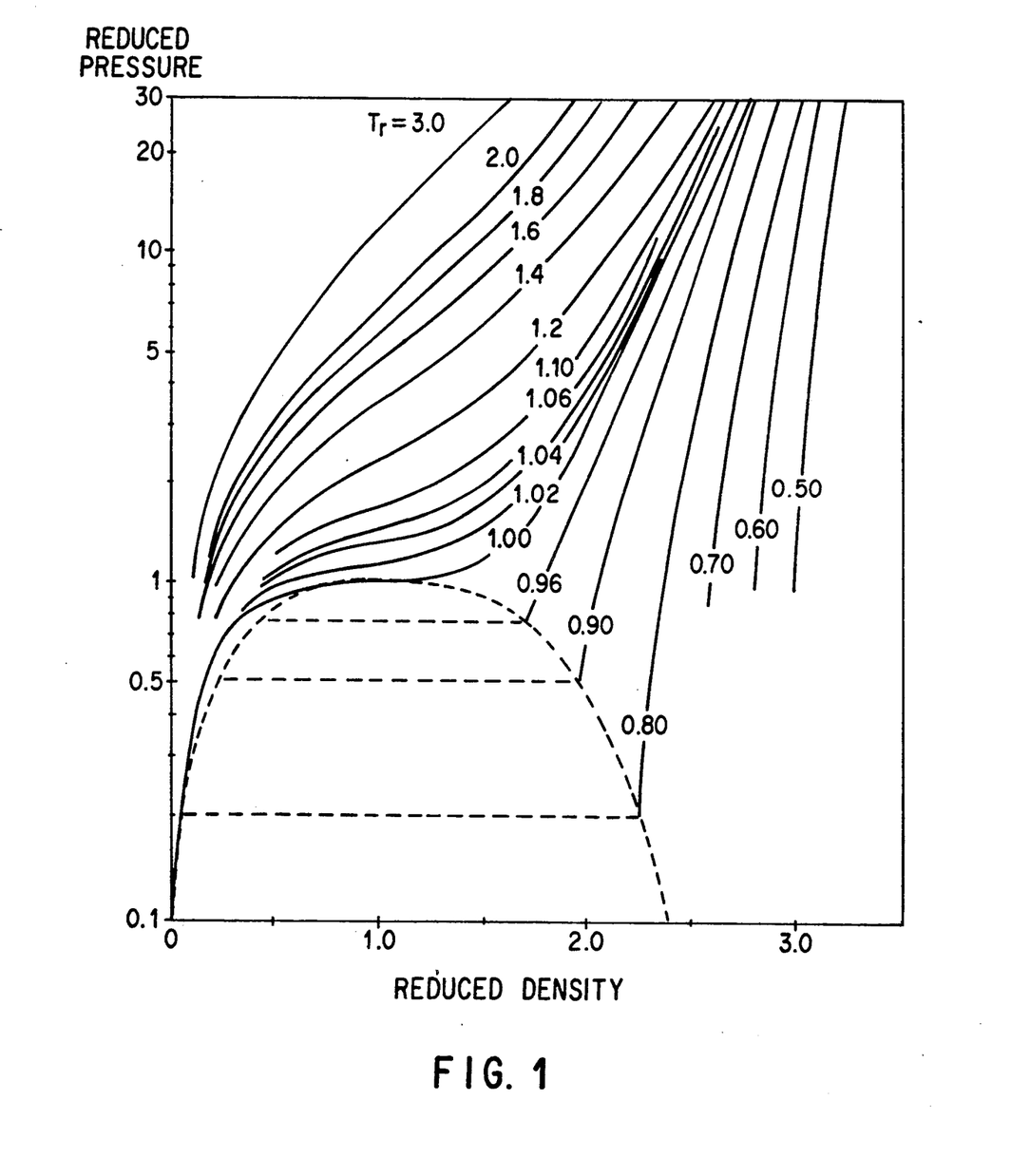
FIG. 1 is a diagram of the pressure-temperature behavior of carbon dioxide in the vicinity of its critical point.

At the critical point of a compound the liquid and vapor phase become identical and merge. This phenomenon can be observed visually by noting the point at which the meniscus or interface between the liquid and vapor phases disappears. The physical properties of a supercritical fluid such as density and viscosity, generally fall between those of the gas and the liquid phases. These properties are strong functions of the system pressure in the supercritical region. Such behavior is shown for carbon dioxide ($CO_2$) in FIG. 1. Small increases in pressure result in large density increases when the temperature is maintained close to its critical value. This allows the density of a supercritical fluid to be adjusted over a wide range, whereas most liquids are only marginally compressible.

Generally, any supercritical fluid that is relatively compressible would be suitable for use in the present flotation method. Representative suitable supercritical fluids and their relevant thermophysical properties are given in Table 1. The requirements of the presentation flotation method suggest that any fluid having a reduced temperature (defined as the actual fluid temperature T divided by the fluid's critical temperature $T_c$) of between approximately 0.8 and 1.2 will be suitable. Conventional liquids, such as water, however, exhibit critical temperatures that are extremely high. Achieving a reduced temperature between the range of 0.8 and 1.2 would, therefore, require a very high process temperature. To minimize energy costs, the present method is preferably practiced at temperatures between 0° and 100° C. Moreover, by selecting fluids exhibiting critical temperatures that are relatively mild, thermally labile materials can be processed without fear of degradation.

TABLE 1

Thermophysical Properties of Several Representative Fluids

| Fluid | $T_c$ (C.) | $P_c$ (atm) | $\sigma_c$ (g/cc) | $T_{boil}$ (C.) | $\sigma_{liq}$ (g/cc) |
|---|---|---|---|---|---|
| $CO_2$ | 31.0 | 72.8 | 0.468 | −78.5* | 1.56 |
| $SF_6$ | 45.6 | 37.1 | 0.734 | −50.8* | 1.54$^a$ |
| Ar | −122.4 | 48.1 | 0.533 | −185.7 | 1.40 |
| Kr | −63.8 | 54.3 | 0.919 | −153.4 | 2.41 |
| Xe | 16.6 | 57.6 | 1.110 | −109.1 | 3.06 |
| $CH_4$ | −82.6 | 45.4 | 0.162 | −161.4 | 0.42 |
| $C_2H_6$ | 32.3 | 48.2 | 0.203 | −88.6 | 0.55 |
| $C_3H_8$ | 96.7 | 41.9 | 0.217 | −42.2 | 0.59 |
| $C_2H_4$ | 9.2 | 49.7 | 0.218 | −103.9 | 0.57 |
| $C_3H_6$ | 91.8 | 45.6 | 0.233 | −48.0 | 0.61 |
| $CH_3OH$ | 239.4 | 79.9 | 0.272 | 64.7 | 0.79$^b$ |
| $C_2H_5OH$ | 243.1 | 63.0 | 0.276 | 78.4 | 0.79$^b$ |
| $H_2O$ | 374.2 | 218.3 | 0.315 | 100.0 | 1.00$^b$ |
| $CF_4$ | −45.6 | 36.9 | 0.630 | −128.0 | 1.62 |
| $C_2F_6$ | 24.3 | 32.6 | 0.617 | −78.2 | 1.61 |
| $C_3F_8$ | 71.9 | 26.5 | 0.628 | −36.7 | 1.29$^b$ |
| $CF_3H$ (Freon 23) | 25.9 | 47.7 | 0.526 | −30.0 | 1.22 |
| $CCl_3H$ | 263.2 | 54.0 | 0.500 | 61.2 | 1.49$^b$ |
| $CCl_4$ | 283.2 | 45.0 | 0.558 | 76.8 | 1.60$^b$ |
| $CClF_3$ (Freon 13) | 28.9 | 38.7 | 0.579 | −80.0 | 1.73 |
| $CCl_2F_2$ (Freon 12) | 111.8 | 40.7 | 0.558 | 41.0 | 1.33$^b$ |

Notes:
*sublimes, melting temperature given instead
$^a$density at 0° C.
$^b$liquid density at room temperature A number of other factors should be considered in selecting a fluid with which to effect the separation. First, the fluid must exhibit the proper density range in the vicinity of its critical point. Second, the fluid should preferably be a poor solvent for the polymers or other materials to be separated. Third, the fluid should preferably be non-toxic, environmentally safe and nonflammable. Fourth, the fluid should preferably have a high vapor pressure at ambient temperatures to ensure that essentially no fluid residue remains in the materials after recovery. Finally, the fluid should preferably be inexpensive. Using the above criteria, $CO_2$ and sulfur hexafluoride ($SF_6$) are two preferred supercritical fluids for use in the present method.

Because a large fluid density range can be accessed via small pressure and temperature changes, a separation scheme using near-supercritical or supercritical fluids can assume a variety of configurations. Preferably, injection of solids into a high pressure vessel should be avoided, as it would require fabrication of specialized dynamic seals for the feed unit and/or the pumping of a plastic/fluid slurry. Either of these situations greatly increases the complexity of the process and also increases the likelihood of maintenance. To provide optimal economic advantages, the separation system should preferably operate on a continuous basis.

Furthermore, the amount of fluid exhausted from the system should preferably be minimized. Clearly, in the case of a relatively expensive fluid, such as $SF_6$, process economics will demand retaining as much fluid as possible after each separation cycle. Even in the case of an inexpensive fluid, such as $CO_2$, environmental demands necessitate that the process be run as "clean" as possible. Minimizing fluid retention is, therefore, sensible from either an environmental or economic standpoint.

Preferably, the system is configured to provide one density-based separation per stage. Attempting to separate multiple components in a single stage by generating a single-stage density gradient (using temperature, for example) can lead to substantial convection currents and thus reduced separation efficiency given the low viscosity of the fluids in question. Each single-separation stage of the present method may be performed in a separate pressure vessel or autoclave, but preferably the entire separation is performed in a single vessel.

Figure 2:
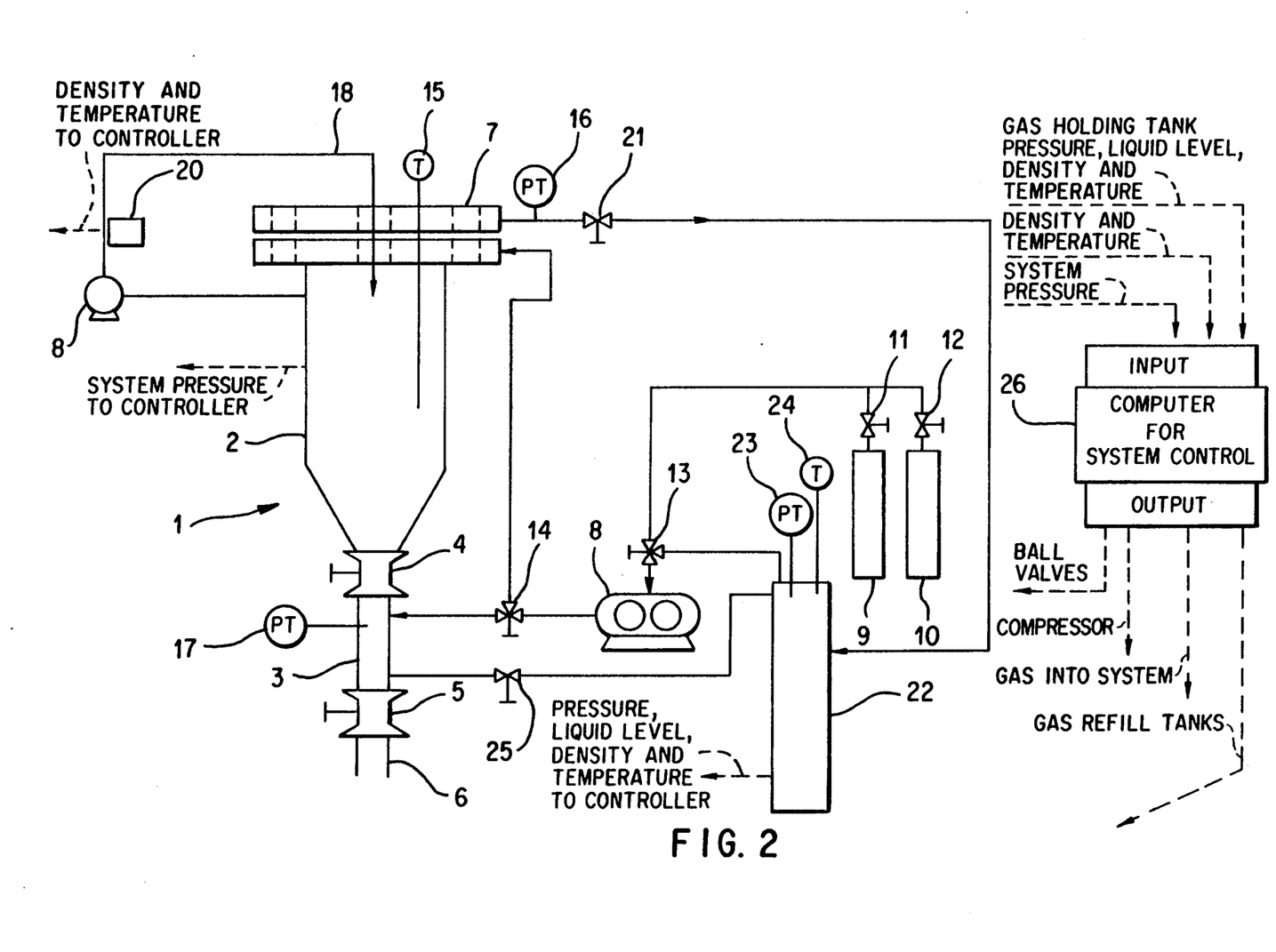
FIG. 2 is a schematic diagram of a preferred embodiment of the present invention.

Accordingly, a preferred manner of practicing the present method is illustrated in FIG. 2. In this embodiment, the separation takes place in a single, high-pressure vessel 1. The high-pressure vessel 1 preferably comprises an upper chamber 2 and a lower separation chamber 3. Preferably a high-pressure ball valve 4 is situated between the upper chamber 2 of the vessel 1 and the lower chamber 3. The apparatus depicted in FIG. 2 is not necessarily drawn to scale. In actual practice, the lower chamber 3 can be as large relative to the upper chamber 2 as the separation to be effected requires. At the bottom of the separation chamber 3 a second high-pressure ball valve 5 is preferably located between the separation chamber 3 and the exit pathway 6.

In operation, a feed of mixed components to be separated is charged into the vessel 1 via a top section 7. At this stage of the operation, ball valve 4 is open and ball valve 5 is closed. A fluid is then charged into the upper chamber 2 and the lower chamber 3 of the vessel 1 via a compressor 8. The fluid to be charged into the vessel 1 is stored in pressurized storage tanks 9 and 10. A single storage tank can be used if the separation can be effected with a single fluid. Depending upon the content of the feed, however, it may be preferable to perform the separation with a mixture of two or more fluids. Separation of lighter components may require only a fluid such as $CO_2$, for example, while separation of heavier components may be accomplished using a fluid or mixture of fluids (such as $CO_2/SF_6$) that exhibits the required density range in the vicinity of the critical point.

In FIG. 2, two storage tanks 9 and 10 are shown, each containing a different fluid. The flow from the storage tanks 9 and 10 can be controlled via valves 11 and 12 so as to charge the vessel with the desired fluid mixture. Valve 13 controls the flow of the fluid to the compressor 8, while valve 14 controls the flow from the compressor 8 to the lower chamber 3 and the upper chamber 2.

The vessel 1 is preferably maintained at constant temperature by a heating means (not shown) such as heating coils or other heating means. The temperature of the system is measured by a temperature sensing means 15 such as a thermocouple while the pressure is measured by pressure transducers 16 and 17.

Preferably, fluid is initially charged to the vessel 1 so as to reach a predetermined pressure such that all the components of the feed are floated. By floating the entire feed mixture and providing sufficient agitation, an efficient separation can be ensured. Agitation is accomplished by a recirculation loop 18 including a recirculating pump 19. A densimeter/flowmeter 20 is provided within the recirculation loop 18 to measure the fluid density and the recirculation flow rate.

After sufficient fluid is charged to the vessel 1 to float the entire feed mixture and sufficient agitation has occurred, the pressure is reduced via a back pressure regulator valve 21 to set the fluid density to a point between the density of the most dense component and the densities of the remainder of the components.

The fluid released via back pressure regulator valve 21 is charged to a holding tank 22 from which it can later be recycled. The holding tank 22 illustrated in FIG. 2 is not drawn to scale. In actual operation, the holding tank 22 may be much larger than the pressure vessel 1 in that the fluid within the holding tank 22 is stored at low pressure relative to the system pressure. To minimize the volume of the holding tank 22, it is preferably provided with coolant means (not shown). A pressure transducer 23 and temperature sensing means 24 are provided to indicate the pressure and temperature respectively within the holding tank 22.

By reducing the pressure within the vessel 1 to a point between the density of the most dense component and the densities of the remaining components, the most dense component is caused to settle within the lower chamber 3. At this point, ball valve 4 is closed, thereby isolating the lower chamber 3 from the upper chamber 2 and separating the most dense component from the remainder of the components. Therefore, the size of the lower chamber 3 is determined by the volume of the most abundant component to be separated.

The pressure in the lower chamber 3 is then reduced by opening valve 25 and allowing the fluid within the lower chamber 3 to flow to the gas holding tank 22. The pressure within the lower chamber 3 is preferably reduced to a gauge pressure of approximately 10 to 20 psi as determined by pressure transducer 17. When the desired pressure is achieved within the lower chamber 3, valve 25 is closed.

Upon closing valve 25, ball valve 5 is opened. As a result of gravitational force and the 10–20 psi excess pressure over atmospheric pressure within the lower chamber 3, the separated component is vented from the lower chamber 3 via exit pathway 6 into an appropriate receptacle (not shown).

During the separation of each component, therefore, a small volume of fluid is vented from the lower chamber 3. Depending on the nature of the fluid (i.e., its cost and the harm it presents to the environment), it may be preferable to capture the fluid vented from the lower chamber 3 and recycle it to the holding tank 22. In cases of relatively inexpensive fluids, such as $CO_2$, which present virtually no environmentally detrimental consequences when released in small amounts, the fluid from the lower chamber 3 may be vented to the atmosphere.

Depending upon the nature of the component mixture, the loss of fluid upon the opening ball valve 5 may necessitate recharging additional fluid to the lower chamber 3 after the venting of the separated component and the subsequent closing of ball valve 5. Fluid may be recharged to the separation chamber via valve 14 from the gas holding tank 22 or the storage tanks 9 and 10. After recharging a sufficient amount of fluid, valve 14 is closed and ball valve 4 is opened.

After opening ball valve 4, the pressure within the upper chamber 2 and separation chamber 3 is decreased via back pressure regulator valve 21 to a point between the density of the most dense of the remaining components and the densities of the remainder of the components. The most dense of the remaining components thus settles and is separated by closing ball valve 4 and continuing the process as described above. The process is repeated until complete separation is achieved.

It is also possible to effect an efficient separation in a multichambered vessel (having greater than two chambers) in which the respective chambers are arranged in a vertical column. Once again, a means for separating each chamber from the other chambers, such as a high pressure ball valve, is placed between adjacent chambers. The process of separation is much the same as described above for a two-chambered vessel. At each stage of the separation, the densest of the components is caused to settle within the lowermost chamber. That chamber is then environmentally separated from the other chambers by closing the appropriate ball valve. The process is then repeated until each chamber contains a separated component. The separated components are then vented to appropriate receptacles.

Preferably, human intervention in process control of any embodiment of the present invention is minimized by providing computer control. Because the component densities are known, the system can be adequately controlled by inputting the system variables (such as fluid density, temperature, pressure, and recirculation flow rate) to a computer 126. Accordingly, each ball valve and each valve controlling gas flow is preferably provided with a computer-controlled actuator (not shown). The compressor 8, recirculating pump 19 and heating means (not shown) are also preferably computer controlled. Similarly, operation of the holding tank 22 can be controlled by inputting the pressure, density, temperature and liquid level of the fluid within the holding tank to the computer.

The order of separation in the present method can be reversed by adjusting the fluid density to first float only the lightest component of the mixture. The separated light component is then discharged from the uppermost chamber of the system and the process is continued to separate the remaining components. A more efficient separation can be achieved, however, by floating the entire feed mixture, providing agitation and separating the components in the order of decreasing density.

EXAMPLES

Experimental Equipment

Figure 3:
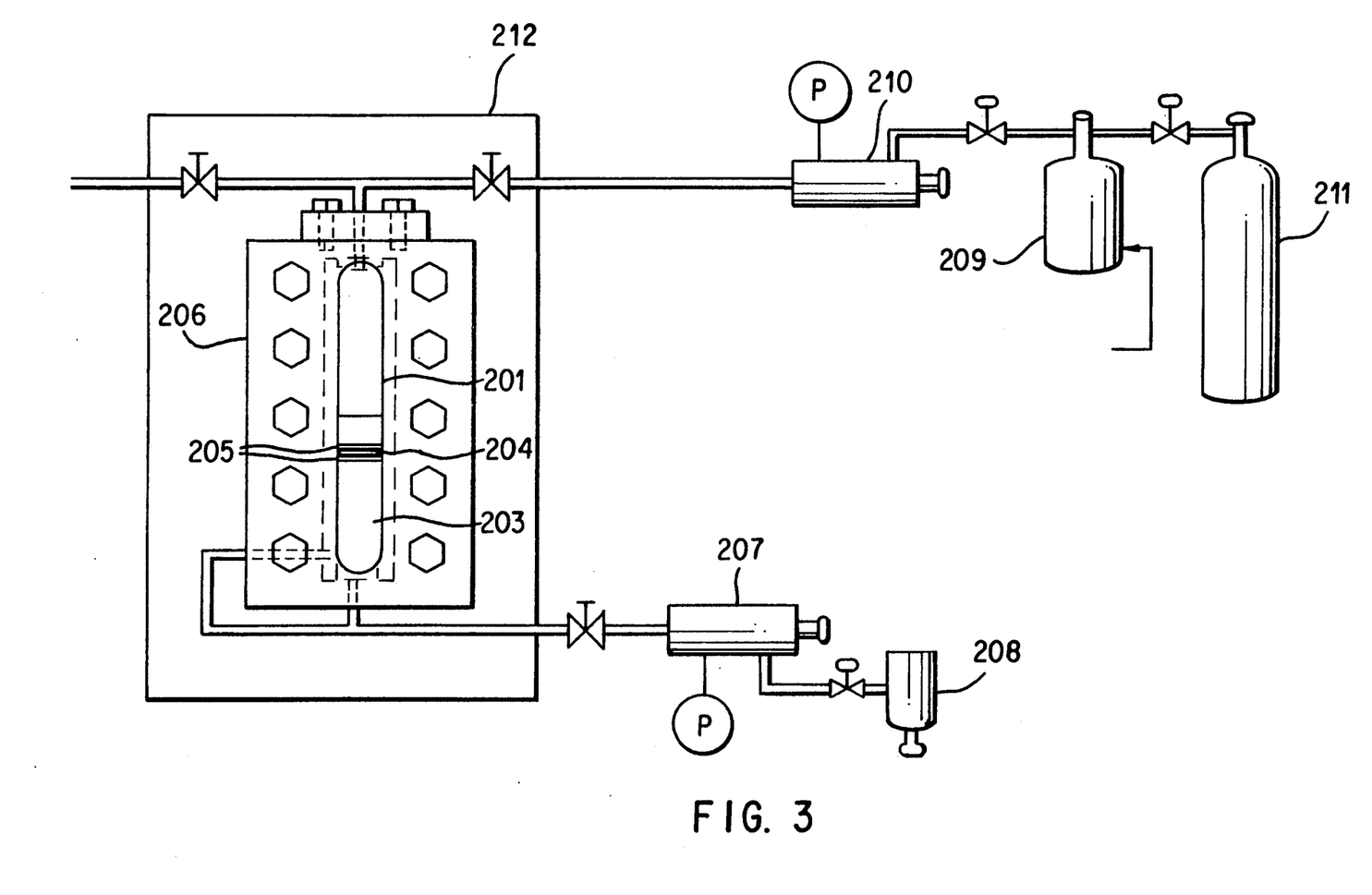
FIG. 3 is a schematic diagram of the apparatus used to perform batch-mode separations.

Batch-mode preliminary experiments using a JEFRI high pressure view cell manufactured by D. B. Robinson and Associates, which is shown in FIG. 3, have confirmed the effectiveness separating a variety of materials by their density using a near-supercritical or supercritical fluid. A number of thermoplastic mixtures were investigated. The nominal densities of these materials are given in Table 2.

TABLE 2

| Densities of Thermoplastics and Other Materials | |
|---|---|
| Material | Density |
| Polyethylene, high density | 0.94–0.965 |
| low density | 0.91–0.93 |
| Polypropylene | 0.902–0.906 |
| Polystyrene, bulk | 1.10 |
| foamed | <0.20 |
| Poly(ethylene terephthalate) | 1.37–1.38 |
| Poly(vinyl chloride), rigid | 1.35–1.45 |
| glass | 2.40–2.80 |
| aluminum | 2.55–2.80 |
| wood | 0.40–0.80 |

The core of the experimental equipment is a heavy-walled quartz tube 201 (interior volume approximately 130 cm$^3$) containing a short, moveable piston 202. The piston 202 separates the plastic/supercritical fluid slurry from the pressure-generating medium 203, a clear silicone oil. An O-ring 204 held in place by Teflon ® spacers 205 in the piston 202 prevents the oil 203 from contacting the fluid while permitting free movement of the piston 202. The tube 201 and the silicone oil 203 are encased in a windowed, 316 SS vessel 206 rated to 10,000 psi. Pressure is generated within the quartz tube 201 by injection of the silicone oil 203 via a Ruska mechanized syringe pump 207 from oil supply 208, thereby moving the piston 202 upwards and decreasing the volume occupied by the supercritical fluid.

In a typical experiment, component mixtures (in he form of $\frac{1}{4}'' \times \frac{1}{4}''$ squares and other geometrical shapes) are charged to the quartz tube 201 (above the piston 202) which is then sealed. A fluid of choice, which is pressurized via a compressor 209 and pump 210, is then introduced from a fluid source 211. An isothermal oven 212 is used to maintain the vessel 206 at a constant temperature. Following temperature equilibration, the pressure is gradually increased and the various components of the mixtures are sequentially floated according to their densities. Following flotation of the entire mixture, the pressure is slowly reduced to check the reversibility of the process and precision of the separation pressure measurements. The windows in the outer steel shell permit visual observation of the entire process.

The fluids used on the present experiments were $CO_2$ and $SF_6$. Research grade $CO_2$ and $SF_6$ were obtained as pressurized liquids from the Linde Division of Union Carbide Corporation. The relevant thermophysical properties of $CO_2$ and $SF_6$ are given in Table 1. The following examples illustrate the separations possible using the present invention.

EXAMPLE 1

In this example, a mixture of PP, LDPE and HDEP was separated from each other and other materials using $CO_2$ at room temperature (approximately 24.0° C.). The other materials present in the feed mixture were tablet paper, newsprint, PS and styrofoam (foamed PS).

Initially, at approximately 970 psi styrofoam floated. The styrofoam then began to reduce in volume (density) and eventually sank. The PP floated at a pressure of approximately 3140 psi. This corresponds to a fluid density of approximately 0.9301 g/cc. At 3280 psi, the LDPE floated, corresponding to a density of approximately 0.9355 g/cc. The slight difference in density between the flotation of PP and that of LDPE demonstrates the specificity of which the present separation method is capable. Finally, the HDPE floated at approximately 4170 psi, corresponding to a density of approximately 0.9651. The tablet paper, newsprint, PS and densified styrofoam did not float upon further increase in pressure to 8400 psi.

EXAMPLE 2

In this example, a mixture of PVC (removed from a commercial pipe), PVC (removed from a commercial bottle), PET (removed from a bottle side), PET (removed from a commercial bottle neck), styrofoam, notebook paper, newsprint and glossy paper was separated at room temperature using $SF_6$.

At 320 psi, the PVC (bottle), the PET (bottle neck) and the styrofoam floated. Once again, a reduction of the volume of the styrofoam samples was noted. This reduction in volume was not as great as observed in supercritical $CO_2$ in Example 1. The styrofoam remained floated throughout the experiment. The PET (bottle side), PVC (pipe), newsprint, notebook paper and glossy paper samples subsequently floated at pressures of 450 psi, 600 psi (density=1.536 g/cc), 900 psi (density=1.565 g/cc), 2070 psi (density=1.646 g/cc) and 3350 psi (density=1.706 g/cc), respectively.

Once again, the excellent selectivity of the present method is apparent. This example also demonstrates the versatility of the present method in the types of materials capable of separation.

EXAMPLE 3

In this example, a mixture of PP, LDPE (removed from a commercial garbage bag), clear HDPE (removed from a milk jug), green-tinted HDPE (removed from a commercial bottle) and blue-tinted HDPE (removed from a commercial bottle) was separated using $CO_2$ at room temperature. The PP, LDPE, clear HDPE, green-tinted HDPE and blue-tinted HDPE floated at 3100 psi, 3850 psi, 3930 psi, 3945 psi and 4135 psi, respectively.

Plastics of the same chemical composition may have different densities because of different processing histories and additives. Tinted or filled materials can thus often be separated from their untinted (or differently tinted) and unfilled counterparts using the present method.

EXAMPLE 4

In this example, a mixture of PS, styrofoam, clear PVC, brown-tinted PVC, clear PET and green-tinted PET was separated using a weight percent mixture of 68.94% $SF_6$ and 31.06% $CO_2$ at room temperature. Remarkably, complete separation was achieved by a maximum pressure of 6340 psi. The PS, styrofoam, clear PVC, brown-tinted PVC, green-tinted PET and clear PET floated at pressures of 1225 psi, 1295 psi, 4630 psi, 4940 psi, 6240 psi and 6340 psi, respectively.

EXAMPLE 5

In this example, a mixture of clear PVC, brown-tinted PVC, clear PET and brown-tinted PET using a weight percent mixture of 72.05% $SF_6$ and 27.95% $CO_2$ at room temperature. The clear PVC, brown-tinted PVC, clear PET and brown-tinted PET floated at pressures of 3520 psi 3670 psi, 4660 psi and 4730 psi, respectively. Thus, clear and tinted pairs of plastics can be separated while maintaining a substantial pressure difference between the flotation pressures of such pairs.

EXAMPLE 6

In this example a mixture of PET (removed from a commercial bottle), PET (a laboratory sample obtained from Aldrich Chemical), PVC (removed from a commercial bottle) and aluminum were separated using $SF_6$ at room temperature and then at 47° C.

At room temperature, PVC floated at 580 psi, PET (laboratory sample) floated at 650 psi and PET (bottle) floated at 800 psi. At a temperature of 47° C., PVC floated at 1000 psi, PET (laboratory sample) floated at 1160 psi, and PET (bottle) floated at 1300 psi.

EXAMPLE 7

In this example, a polyolefin mixture consisting of an ethylene homopolymer and a ethylene-hexene copolymer provided by Union Carbide Corp. was first separated using $SF_6$ at a temperature of 50° C. The same mixture was then separated using $CO_2$ at room temperature.

Using $SF_6$ at 50° C., the mixture separated at 670 psi. Using $CO_2$ at room temperature, the mixture separated at 3980 psi.

EXAMPLE 8

To prevent perturbing the density of the polymers by swelling of the polymers or extraction of their low molecular weight additives, the supercritical fluids were chosen to be relatively poor solvents for the polymers in question. Even with such poor solvents, however, it is conceivable that some effect on polymer density may occur during flotation. To determine whether any swelling or extraction of additives was occurring during flotation, several thermoplastic mixtures were allowed to remain under pressure for 24 hours, after which the flotation/separation sequence was repeated. No change was observed, either in the observed separation pressures or in the physical appearance of the samples following extended exposure to the supercritical fluids.

These examples confirm the excellent selectivity which can be achieved in density-based separations employing near-supercritical and supercritical fluids. Materials with similar densities are readily separated using $SF_6$ or $CO_2$ at various temperatures and pressures in the vicinity of the fluid critical point.

As shown in Example 8, exposure of thermoplastics to $CO_2$ and $SF_6$ under supercritical conditions for periods of time much in excess of the time required for separation generally has little if any effect on the polymer morphology. As illustrated in Examples 1 and 2, however, an exception is found in the case of styrofoam. Styrofoam is found to irreversibly densify when exposed to the supercritical fluids used in the present experiments.

This densification is a result of the collapse of pores within the foamed materials and not by extraction of low molecular weight additives. Similar results would be expected with other foamed materials having a yield stress below the pressures used in the present method.

In the recycling of styrofoam (and other foamed polymers), however, a two-step process is required. These steps consist of: (1) separating the styrofoam from the rest of the components, and (2) densification. These two steps are required to allow the foamed polymers to be reprocessed into other plastic products. The present method, therefore, enables the combination of the separation and densification steps required in the reprocessing of foamed polymers into a single step.

Examples 1 through 8 further demonstrate that either $CO_2$, $SF_6$ or mixtures thereof can be used to separate the thermoplastics which comprise the polyolefin segment of the waste stream as well as other materials exhibiting different densities. The primary advantage to using $CO_2$ is its significantly lower cost (as low as $0.06/lb vs. $3.50/lb for $SF_6$). However, use of $CO_2$ requires higher operating pressures which will undoubtedly increase capital costs for the process. Furthermore, because the fluid density of $CO_2$ cannot be increased significantly beyond 1.10 (the liquid density at the freezing point is approximately 1.20), $CO_2$ alone cannot be used to separate the denser thermoplastics such as PVC and PET. Separations of such heavier materials may be accomplished with the use of $CO_2/SF_6$ mixtures. The $SF_6$ composition of such a mixture is preferably optimized to provide efficient separations of the heavier materials at the lowest total cost.

As also seen from the examples, particularly Examples 6 and 7, generation of the proper density for separation is a function of the temperature, pressure and fluid composition. Furthermore, at a given temperature and fluid composition, the range of pressure over which the separation can be performed is a function of the slope of the density-pressure curve at the condition of interest. As can be seen from FIG. 1, this slope can vary significantly with temperature and pressure. A combination of experimental flotation results, plus equation of state correlation of the pressure-temperature-density behavior of $CO_2$, $SF_6$ and $CO_2/SF_6$ mixtures, will ultimately allow prediction of the operating pressures and extent of the operating window for any given waste mixture.

Although the invention has been described in detail for the purposes of illustration, it is to be understood that such detail is solely for that purpose and that variations can be made therein by those skilled in the art without departing from the scope of the invention except as it may be limited by the claims.

What is claimed is:

1. A method for selectively separating a component material from a mixture of co-mingled materials of different densities by selective density flotation comprising the following steps:
   (a) introducing said mixture of co-mingled materials into a vessel;
   (b) introducing a fluid into said vessel, said fluid having a range of densities in the vicinity of its critical point such that said fluid's density may be set to a density between the density of one component of the co-mingled materials and the densities of the remaining components;
   (c) adjusting the temperature and pressure of said fluid in the vicinity of the critical point of said fluid to set the density of said fluid to be between the density of one component of the co-mingled materials and the densities of the remaining components so as to selectively float that portion of the materials having a density less than the set density of said fluid, thereby dividing one component of the materials from the remaining components; and
   (d) separating the component which has been selectively divided from the remaining components.

2. The method according to claim 1, wherein steps (a) through (d) of claim 1 are repeated until each component of the co-mingled materials is separated from the others.

3. The method according to claim 1, wherein steps (c) and (d) of claim 1 are repeated until each component of the co-mingled materials is separated from the others.

4. The method according to claim 1, wherein said fluid is chosen to have a sufficiently high vapor pressure at ambient temperatures to ensure that substantially no fluid remains in the materials after separation.

5. The method according to claim 1 wherein said fluid is chosen to be a poor solvent for the materials present within said mixture of co-mingled materials.

6. The method according to claim 1 wherein the fluid is chosen to have a critical temperature between 0° and 100° C.

7. The method according to claim 1 wherein, the materials to be selectively separated comprise at least one polymer.

8. The method according to claim 1 wherein the materials to be selectively separated comprise at least one grade of paper.

9. The method according to claim 1 wherein said fluid is carbon dioxide.

10. The method according to claim 1 wherein said fluid is sulfur hexafluoride.

11. The method according to claim 1 wherein said fluid comprises a mixture of carbon dioxide and sulfur hexafluoride.

12. The method according to claim 1, wherein the temperature is adjusted so that a reduced temperature in the range of approximately 0.80 to 1.20 is achieved.

13. A method for selectively separating a component material from a mixture of co-mingled materials of different densities by selective density flotation comprising the following steps:
   (a) introducing a feed of said co-mingled materials into a vessel, said vessel having an upper chamber and a lower chamber, said vessel further having a means for isolating said upper chamber from said lower chamber
   (b) introducing a fluid into said vessel, said fluid having a range of densities in the vicinity of its critical point such that said fluid's density may be set to a density between the density of one component of the co-mingled materials and the densities of the remaining components;
   (c) adjusting the temperature and pressure of said fluid to float all of the components;
   (d) adjusting the temperature and pressure of said fluid to set the density of said fluid to be between the density of the most dense component of the co-mingled materials and the densities of the remaining components so as to selectively float that portion of the materials having a density less than the set density of the fluid within said upper chamber of the vessel while causing the most dense component to settle within said lower chamber, thereby dividing the most dense component of the materials from the remainder of the materials;
   (e) isolating said lower chamber from said upper chamber;
   (f) reducing the pressure within said lower chamber by removing a portion of said fluid from said lower chamber; and
   (g) discharging the divided component from the lower chamber.

14. The method according to claim 13, wherein steps (a) through (g) of claim 13 are repeated until each component of the co-mingled materials is separated from the others.

15. The method according to claim 13, wherein steps (c) through (g) of claim 13 are repeated until each component of the co-mingled materials is separated from the others.

16. The method according to claim 13, wherein said fluid is chosen to have a sufficiently high vapor pressure at ambient temperatures to ensure that substantially no fluid remains in the materials after separation.

17. The method according to claim 13 wherein said fluid is chosen to have a critical temperature between 0° and 100° C.

18. The method according to claim 13 wherein the fluid is chosen to be a poor solvent for the materials present within the feed of co-mingled materials.

19. The method according to claim 13 wherein the materials to be selectively separated comprise at least one polymer.

20. The method according to claim 13 wherein the materials to be selectively separated comprise at least one grade of paper.

21. The method according to claim 13 wherein said fluid is carbon dioxide.

22. The method according to claim 13 wherein said fluid is sulfur hexafluoride.

23. The method according to claim 13 wherein said fluid comprises a mixture of carbon dioxide and sulfur hexafluoride.

24. The method according to claim 13 wherein sufficient agitation is provided within the vessel to achieve an effective separation.

25. The method according to claim 13, wherein the temperature is adjusted so that a reduced temperature in the range of approximately 0.80 to 1.20 is achieved.

* * * * *